(12) United States Patent
Frederiksen et al.

(10) Patent No.: US 12,143,961 B2
(45) Date of Patent: Nov. 12, 2024

(54) ASSIGNMENT OF A SECOND UE IDENTITY TO ADJUST PAGING TIMING FOR UE FOR WIRELESS NETWORK

(71) Applicant: Nokia Technologies Oy, Espoo (FI)

(72) Inventors: Frank Frederiksen, Klarup (DK); Mads Lauridsen, Gistrup (DK); Daniela Laselva, Klarup (DK); Klaus Pedersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 278 days.

(21) Appl. No.: 17/431,914

(22) PCT Filed: Mar. 4, 2020

(86) PCT No.: PCT/FI2020/050135
§ 371 (c)(1),
(2) Date: Aug. 18, 2021

(87) PCT Pub. No.: WO2020/178483
PCT Pub. Date: Sep. 10, 2020

(65) Prior Publication Data
US 2022/0150869 A1 May 12, 2022

Related U.S. Application Data

(60) Provisional application No. 62/814,792, filed on Mar. 6, 2019.

(51) Int. Cl.
*H04W 68/02* (2009.01)
*H04W 8/00* (2009.01)
*H04W 72/21* (2023.01)

(52) U.S. Cl.
CPC ........... *H04W 68/02* (2013.01); *H04W 8/005* (2013.01); *H04W 72/21* (2023.01)

(58) Field of Classification Search
CPC ...... H04W 68/02; H04W 8/005; H04W 72/21
See application file for complete search history.

(56) References Cited

U.S. PATENT DOCUMENTS

| 2010/0279715 | A1 | 11/2010 | Alanara et al. |
| 2011/0122809 | A1* | 5/2011 | Yun ........................ H04W 68/12 370/328 |

(Continued)

FOREIGN PATENT DOCUMENTS

| CN | 101521959 A | 9/2009 |
| CN | 101554082 A | 10/2009 |

(Continued)

OTHER PUBLICATIONS

"New SID: Study on UE Power Saving in NR", 3GPP TSG RAN Meetings #80, RP-181463, CATT, Jun. 11-14, 2018, 5 pages.

(Continued)

*Primary Examiner* — Mazda Sabouri
(74) *Attorney, Agent, or Firm* — Brake Hughes Bellermann LLP

(57) ABSTRACT

A method includes receiving, by a user equipment (UE), at least a first UE identity assigned to the user equipment for a wireless network, the first UE identity associated with a first paging timing; and receiving, by the user equipment, a second UE identity that has been assigned to the user equipment at least for paging purposes that adjusts a paging timing from a first paging timing associated with the first UE identity to a second paging timing associated with the second UE identity, wherein the second paging timing is different from the first paging timing.

19 Claims, 7 Drawing Sheets

(56) References Cited

U.S. PATENT DOCUMENTS

| | | | |
|---|---|---|---|
| 2013/0115977 A1 | 5/2013 | Chandramouli et al. | |
| 2013/0165182 A1* | 6/2013 | Christensen | H04W 48/18 |
| | | | 455/558 |
| 2014/0073366 A1 | 3/2014 | Xing et al. | |
| 2018/0084523 A1 | 3/2018 | Uchiyama et al. | |
| 2018/0324746 A1 | 11/2018 | Balasubramanian et al. | |

FOREIGN PATENT DOCUMENTS

| | | |
|---|---|---|
| CN | 103250438 A | 8/2013 |
| CN | 103733702 A | 4/2014 |
| CN | 105409307 A | 3/2016 |
| CN | 106465352 A | 2/2017 |
| CN | 108307693 A | 7/2018 |
| WO | 2018083605 A1 | 5/2018 |
| WO | 2018/161244 A1 | 9/2018 |
| WO | 2018174635 A1 | 9/2018 |
| WO | 2018/176219 A1 | 10/2018 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304, V15.1.0, Sep. 2018, pp. 1-55.

"3rd Generation Partnership Project; Technical Specification Group Services and System Aspects; Security architecture and procedures for 5G system (Release 15)", 3GPP TS 33.501, V15.2.0, Sep. 2018, pp. 1-175.

"3rd Generation Partnership Project; Technical Specification Group Services and System Aspects; 3GPP System Architecture Evolution (SAE); Security architecture (Release 15)", 3GPP TS 33.401, V15. 5.0, Sep. 2018, pp. 1-163.

"3rd Generation Partnership Project; Technical Specification Group Services and System Aspects; Study on the security aspects of the next generation system (Release 14)", 3GPP TR 33.899, V1.3.0, Aug. 2017, 605 pages.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.3.0, Sep. 2018, pp. 1-59.

"3rd Generation Partnership Project; Technical Specification Group Services and System Aspects; 3G security; Network Domain Security (NDS); IP network layer security (Release 15)", 3GPP TS 33.210, V15.1.0, Sep. 2018, pp. 1-27.

Belshe et al., "Hypertext Transfer Protocol Version 2 (HTTP/2)", RFC 7540, Internet Engineering Task Force (IETF), May 2015, pp. 1-96.

Postel, "Hypertext Transfer Protocol Version 2 (HTTP/2)", RFC 793, Darpa Internet Program Protocol Specification, Sep. 1981, 91 pages.

Bray, "The JavaScript Object Notation (JSON) Data Interchange Format", RFC 7159, Internet Engineering Task Force (IETF), Mar. 2014, pp. 1-16.

Hardt, "The OAuth 2.0 Authorization Framework", RFC 6749, Internet Engineering Task Force (IETF), Oct. 2012, pp. 1-76.

Jones et al., "JSON Web Encryption (JWE)", RFC 7516, Internet Engineering Task Force (IETF), May 2015, pp. 1-51.

Jones et al., "JSON Web Signature (JWS)", RFC 7515, Internet Engineering Task Force (IETF), May 2015, pp. 1-59.

"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.3.0, Sep. 2018, pp. 1-918.

"3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

International Search Report and Written Opinion received for corresponding Patent Cooperation Treaty Application No. PCT/FI2020/050135, dated May 26, 2020, 16 pages.

"3rd Generation Partnership Project; Technical Specification Group Radio Access Network; NR; User Equipment (UE) procedures in Idle mode and RRC Inactive state (Release 15)", 3GPP TS 38.304, V15.2.0 , Dec. 2018, pp. 1-28.

Office Action received for corresponding Indian Patent Application No. 202147044457, dated Mar. 21, 2022, 8 pages.

Office action received for corresponding Japanese Patent Application No. 2021-552667, dated Sep. 27, 2022, 2 pages of office action and 4 pages of translation available.

Extended European Search Report received for corresponding European Patent Application No. 20766761.9, dated Oct. 19, 2022, 9 pages.

Final Office action received for corresponding Japanese Patent Application No. 2021-552667, dated Jul. 4, 2023, 2 pages of office action and 3 pages of translation available.

Substantive Examination Report received for Indonesia Patent Application No. P00202107418, mailed on Oct. 6, 2023, 7 pages.

Office Action and Search Report for Chinese Patent Application No. 202080018743.5, mailed on Apr. 19, 2024, 9 pages.

Office Action for Japanese Patent Application No. 2021-552667, mailed on Apr. 16, 2024, 7 pages.

SA WG2 Temporary Document; SA WG2 Meeting #S2-124; S2-178684; "23.502: UE Response to Paging and NAS Notification", Source: Samsung; Agenda Item: 6.5.10; Work Item/Release: 5GS_ph1/Rel-15; Reno, Nevada, USA; Nov. 27-Dec. 1, 2017; 16 pages.

Office Action and Search Report for Chinese Application No. 202080018743.5, mailed on Oct. 28, 2023, 13 pages.

Office Action and Search Report for Chinese Patent Application No. 202080018743.5, mailed on Aug. 29, 2024, 12 pages.

* cited by examiner

ASSIGNMENT OF A SECOND UE IDENTITY TO ADJUST PAGING TIMING FOR UE FOR WIRELESS NETWORK

RELATED APPLICATION

This application was originally filed as PCT Application No. PCT/FI2020/050135 on Mar. 4, 2020, which claims priority from U.S. Provisional Application No. 62/814,792, filed on Mar. 6, 2019, each of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. For example, ultra-reliable and low-latency communications (URLLC) devices may require high reliability and very low latency.

SUMMARY

According to an example embodiment, a method may include: receiving, by a user equipment (UE), at least a first UE identity assigned to the user equipment for a wireless network, the first UE identity associated with a first paging timing; and receiving, by the user equipment, a second UE identity that has been assigned to the user equipment at least for paging purposes that adjusts a paging timing from a first paging timing associated with the first UE identity to a second paging timing associated with the second UE identity, wherein the second paging timing is different from the first paging timing.

According to an example embodiment, an apparatus may include means for receiving, by a user equipment (UE), at least a first UE identity assigned to the user equipment for a wireless network, the first UE identity associated with a first paging timing; and means for receiving, by the user equipment, a second UE identity that has been assigned to the user equipment at least for paging purposes that adjusts a paging timing from a first paging timing associated with the first UE identity to a second paging timing associated with the second UE identity, wherein the second paging timing is different from the first paging timing.

According to an example embodiment, an apparatus may include: at least one processor; and at least one memory including computer program code; the at least one memory and the computer program code configured to, with the at least one processor, cause the apparatus at least to: receive, by a user equipment (UE), at least a first UE identity assigned to the user equipment for a wireless network, the first UE identity associated with a first paging timing; and receive, by the user equipment, a second UE identity that has been assigned to the user equipment at least for paging purposes that adjusts a paging timing from a first paging timing associated with the first UE identity to a second paging timing associated with the second UE identity, wherein the second paging timing is different from the first paging timing.

According to an example embodiment, a non-transitory computer-readable storage medium comprising instructions stored thereon that, when executed by at least one processor, are configured to cause a computing system to perform a method of: receiving, by a user equipment (UE), at least a first UE identity assigned to the user equipment for a wireless network, the first UE identity associated with a first paging timing; and receiving, by the user equipment, a second UE identity that has been assigned to the user equipment at least for paging purposes that adjusts a paging timing from a first paging timing associated with the first UE identity to a second paging timing associated with the second UE identity, wherein the second paging timing is different from the first paging timing.

According to an example embodiment, a method may include: determining that a first paging timing associated with a first UE identity that is assigned to a first user equipment is misaligned with, or occurring at a different time than, a second paging timing associated with a second UE identity that is assigned to a second user equipment; and sending a message to the first user equipment to assign, at least for paging or control purposes, a third UE identity to the first user equipment, wherein the third UE identity is associated with a third paging timing; wherein the third paging timing is aligned with, or occurring at a same time as, the second paging timing.

According to an example embodiment, an apparatus may include means for determining that a first paging timing associated with a first UE identity that is assigned to a first user equipment is misaligned with, or occurring at a different time than, a second paging timing associated with a second UE identity that is assigned to a second user equipment; and means for sending a message to the first user equipment to assign, at least for paging or control purposes, a third UE identity to the first user equipment, wherein the third UE identity is associated with a third paging timing, wherein the third paging timing is aligned with, or occurring at a same time as, the second paging timing.

According to an example embodiment, an apparatus may include: at least one processor; and at least one memory including computer program code; the at least one memory and the computer program code configured to, with the at least one processor, cause the apparatus at least to: determine that a first paging timing associated with a first UE identity that is assigned to a first user equipment is misaligned with, or occurring at a different time than, a second paging timing associated with a second UE identity that is assigned to a second user equipment; and send a message to the first user equipment to assign, at least for paging or control purposes, a third UE identity to the first user equipment, wherein the third UE identity is associated with a third paging timing; wherein the third paging timing is aligned with, or occurring at a same time as, the second paging timing.

According to an example embodiment, a non-transitory computer-readable storage medium comprising instructions stored thereon that, when executed by at least one processor, are configured to cause a computing system to perform a method of: determining that a first paging timing associated with a first UE identity that is assigned to a first user equipment is misaligned with, or occurring at a different time than, a second paging timing associated with a second UE identity that is assigned to a second user equipment; and sending a message to the first user equipment to assign, at least for paging or control purposes, a third UE identity to the first user equipment, wherein the third UE identity is associated with a third paging timing; wherein the third paging timing is aligned with, or occurring at a same time as, the second paging timing. The details of one or more examples of embodiments are set forth in the accompanying drawings and the description below. Other features will be apparent from the description and drawings, and from the claims.

DETAILED DESCRIPTION

Figure 1:
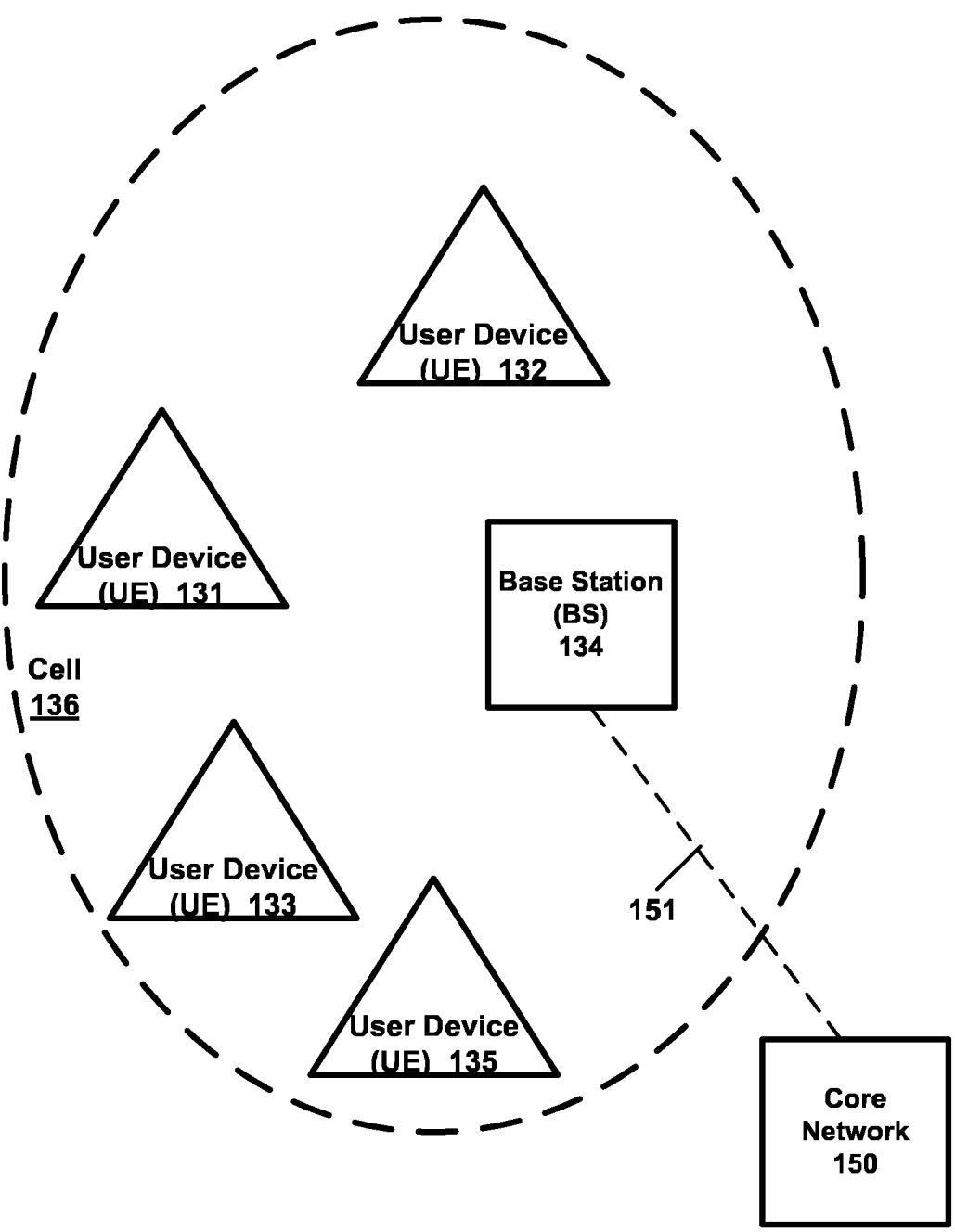
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

Packet data traffic is often very bursty, e.g., such as with occasional periods of transmission activity followed by longer periods of silence. Rather than have a UE continuously monitor a downlink channel for downlink data (which would consume significant UE power), a UE may use a discontinuous reception (DRX) to reduce power consumption. According to an example embodiment, monitoring may include receiving downlink control information on a channel, and determining if one or more specific signals have been received on the channel. For example, monitoring may include receiving downlink control information on a channel, and determining if one or more specific signals have been received that indicate the presence of downlink data on the downlink data channel or the presence of an UL transmission grant for use of the uplink data channel.

According to DRX, a UE monitors downlink control signaling for a paging message only at specific time instants (e.g., according to a paging timing for the UE, or according to a DRX cycle for the UE), such as every 100 ms or other paging timing (e.g., where the paging timing defines or determines the paging time instants when paging messages may be received by the UE). Thus, for example, a paging cycle (or DRX cycle) may be defined for a UE, in which the UE may sleep (e.g., placing one or more of its circuits, or the receiver and/or transmitter of the UE off or in a low power state) most of the time, and only briefly wake (powering on its circuits, receiver and/or transmitter) to monitor or receive downlink control signaling to determine if the network (e.g., CN) has downlink data to be transmitted to the UE.

For example, upon waking from a sleep or low power state, the UE may monitor (e.g., receive and/or decode) downlink control information (DCI) on a physical downlink control channel (PDCCH) for the presence of a paging message, e.g., which may be (as an example) information encrypted by a paging identifier, such as information encrypted with a paging-radio network temporary identifier (P-RNTI). The presence of a paging message (e.g., which may be, for example, information encrypted with the P-RNTI) indicates that the network may have downlink data for delivery to the UE. For example, if the UE detects a paging message (e.g., detects the P-RNTI) on the DCI, the UE may then receive (decode) further control information (e.g., within a resource or resource block indicated by the paging message) to determine if its UE identity is indicated or provided in this further control information. If the UE finds its UE identity, then this indicates that the core network has downlink data for delivery (transmission) to the UE. After detecting its UE identity, the UE may perform a random access (RA or RACH) procedure with a cell or BS (or eNB/gNB) to establish a connection (for the UE to transition to a connected state) with the cell, and then the UE may receive the downlink data from the core network via the cell. After receiving the downlink data (and possibly sending/transmitting any data it may need to transmit), the UE may then, for example, re-enter or resume the sleep state or low power state (which may be, for example, DRX sleep state in RRC_CONNECTED, DRX sleep state in RRC_IDLE state or RRC_INACTIVE state, as illustrative examples, where RRC refers to radio resource control), and remain in this sleep state until the next occasion (e.g., as indicated by the DRX cycle in terms of a paging pattern or PDCCH monitoring pattern for the UE) that the UE needs to wake from sleep again (e.g., power on its receiver and other circuits) and check for e.g., a paging or scheduling message on the downlink control information.

A paging pattern may include or may indicate one or more times (time instants) when a UE should wake from sleep and check for a paging message, and then, e.g., if a paging message is detected, check for its UE identity in a resource block or channel.

Thus, paging is a network technique that may be used to contact the UE for the cases of downlink traffic to be delivered or transmitted to the UE. For RRC_Idle and/or RRC_Inactive UEs, this is typically implemented as a paging mechanism where the network and the UE have a common understanding of how and when the UE should be monitoring a channel for paging message(s) from the network (core network). According to an example embodiment, to have a statistical distribution of UEs in the time domain, the time instants where UEs will listen or monitor for paging messages may be distributed through an algorithm which will define the UE paging frame as a combined function of the UE (UE unique or UE-specific, at least within a network) identity and the system timing. For LTE the paging frame may be the radio frame where the UE will listen for paging messages, and depending on configuration, the UE may further have an assigned (still from the UE_ID) a subframe within the paging frame. It is possible for the eNB/BS to control the amount and/or distribution of UEs in the time/resource domain by configuring paging related DRX parameters. The procedures may be similar for NR/5G, and the inactive (e.g., RRC_Inactive) UE may listen or monitor a channel for CN paging, calculated using the NR-equivalent IMSI, called 5G-S-TMSI, and RAN paging using the RRC_Inactive RNTI: I-RNTI. Furthermore, in NR (5G), when multiple beams are used for paging transmission, a paging occasion (PO) may include a set of PDCCH (physical downlink control channel) monitoring occasions—one for each beam—and these PDCCH monitoring occasions are allocated in time. For these reasons, a table-based PO (paging occasion) configuration mechanism of LTE has been replaced in NR/5G by a mechanism based on the paging-SearchSpace. These are merely some illustrative examples of how a UE may determine or find its paging timing, such as its PF and PO. Also, these are some illustrative examples of UE identities that may be used for UEs.

Thus, according to an illustrative example embodiment, a UE may determine its paging timing by determining a paging frame (PF) and one or more paging occasions (PO) within the PF where (when) the UE should monitor for a paging message. According to an example embodiment, a paging frame (PF) may contain one or multiple PO(s). According to an example embodiment, a paging timing (e.g., which may be or may include a paging frame (PF) and/or a paging occasion (PO)), indicating when the UE should monitor downlink control information for a paging message, may be determined based on a UE identity (e.g., UE_ID) for the UE.

As noted, according to an illustrative example embodiment, the UE may use Discontinuous Reception (DRX) in RRC_IDLE and RRC_INACTIVE state in order to reduce power consumption. The UE may, for example, monitor (e.g., receiving downlink signals to detect a paging message) one or more paging occasions (POs) per DRX cycle. A PO may include a set of PDCCH monitoring occasions and/or may include multiple time slots (e.g., subframe or OFDM symbol) where a paging message may be transmitted to the UE. Also, for example, a Paging Frame (PF) may be a Radio Frame and may include one or multiple PO(s) or starting point of a PO. A same paging message may be used for both RAN (radio access network or BS) initiated paging and CN initiated paging.

By way of an illustrative example, a paging timing, e.g., which may include a PF, may be determined based the UE_ID for the UE, according to Eqn. 1. A SFN (system frame number) for the PF (paging frame) may be determined for the UE based on Eqn. 1 as follows:

$$(SFN+PF\_offset) \bmod T = (T \text{ div } N)*(UE\_ID \bmod N); \quad \text{(Eqn. 1)}$$

Index (i_s), indicates the start of a set of PDCCH (physical downlink control channel0 monitoring occasions for the paging message, is determined by:

$$i\_s = \text{floor}(UE\_ID/N) \bmod Ns$$

For default association, Ns is either 1 or 2. For Ns=1, there is only one PO which starts in the PF. For Ns=2, PO is either in the first half frame (i_s=0) or the second half frame (i_s=1) of the PF.

For non-default association (i.e., when pagingSearchSpace is used), the UE monitors the (i_s+1)th PO where the first PO starts in the PF.

Some example parameters that may be used to determine PF and PO, based on Eqn. 1. T: DRX cycle of the UE. N: number of total paging frames in T; Ns: number of paging occasions for a PF; PF_offset: offset used for PF determination; UE_ID: a UE identifier, e.g., such as, for example, a 5G-S-TMSI (temporary mobile subscriber identity) mod 1024.

Parameters N, Ns, first-PDCCH-MonitoringOccasion-OfPO, PF_offset, and the length of default DRX Cycle may be transmitted or signaled by BS/gNB within system information, such as within SIB1, for example. Also, other techniques may be used to determine a paging timing for a UE.

In normal UE operations in current networks, a UE will have a "hardcoded" (or static or fixed) UE (UE-specific) identity towards the core network. As one example, the UE may be assigned a fixed or static International Mobile Subscriber Identity (IMSI) or a fixed or static (5G or NR) Temporary Mobile Subscription Identifier (TMSI). The IMSI in LTE and 5G-S-TMSI in 5G/New Radio (NR) may be used by the UE to determine the paging timing (e.g., paging frame (PF)) for the UE, e.g., indicating the exact time that the UE should be monitoring network signaling (e.g., downlink control information) for a paging message. For example, the UE identifier may be converted (or used) by the UE through an equation, such as Eqn. 1 as an example, to calculate or determine the paging frame (as an example paging timing) for the UE. One function of the existing paging mechanisms is to distribute all devices connected to the network in a statistically fair manner such that there is an equal probability of having a given load on the available network resources (paging frame as one example). This mechanism provides a straight-forward mapping when considering a UE with a single identity and no need for network or UE control of loading of the available resources.

Some examples of a UE (UE-specific) identity may include an International Mobile Subscriber Identity (IMSI), or a (5G or NR) Temporary Mobile Subscription Identifier (TMSI). These are some examples of UE-specific (e.g., a different UE identity assigned to each UE within a network) UE identities, and other (UE-specific) UE identities may be used.

Thus, according to an example embodiment, a paging timing for a UE may be associated with its UE identity (e.g., IMSI, TMSI, or other UE identity) assigned to the UE. For example, Eqn. 1 describes an example technique that may be used by a UE to determine the paging timing (e.g., a PF) that is associated with its UE identity. As noted, a paging timing may indicate a time when the UE monitors or receives (or a time when the UE should monitor or receive) downlink control information for a paging message, and/or a paging timing may indicate a time when a paging message may be transmitted to the UE. In current networks, a paging timing for a UE will be fixed or static, based on a fixed or static UE identity (e.g., a fixed TMSI, IMSI) for the UE.

However, according to an example embodiment, there may be situations or applications in which it may be advantageous for a paging timing for a UE to be changed or adjusted. Therefore, according to an example embodiment, a UE may be able to obtain an adjusted or different paging timing via an assignment of an additional or another (or a second) UE identity that is different than a first or an initial UE identity assigned to the UE. According to an illustrative example embodiment, a UE may be assigned a first UE identity that is associated with a first paging timing. Then, the UE may be assigned a second UE identity (different from the first UE identity) that is associated with a second paging timing, where the second paging timing is different from the first paging timing), where the second or additional UE identity may be used at least for paging purposes. Thus, the use of the second or additional UE identity (at least for paging) results in changing the paging timing or the time(s) when the UE will monitor downlink control information for a paging message.

For example, the UE may detect a need for a different paging timing, and then send a request to the BS or CN for another (or a second) UE identity associated with a different paging timing. For example, the UE may be assigned two UE identities, e.g., each UE identity associated with (or assigned by) different networks or different network operators, that have the same (or aligned) paging timing (e.g., the UE may need to monitor or receive downlink signaling from the two different networks or network operators, for different paging messages, which may be sent on different frequency resources). However, a UE may typically be unable to monitor or receive downlink control signals for paging messages from different networks (e.g., a first network, and a second network) or different network operators at the same time, since a UE typically includes only one receiver. Thus, in the situation of colliding (or aligned) paging time instants for two UE identities, it may be desirable to adjust (e.g., offset or misalign) a paging timing of the UE for one of the networks or network operators, so that the UE can separately (at different times) monitor or receive downlink control information for the two networks or network operators (e.g., which may be on different frequency resources). Thus, in that case, the UE may send a request to one of the networks, to request a third UE identity to be assigned to the UE for at least paging purposes, e.g., in order to adjust paging timing for the UE for that network, so that paging timings for the UE with respect to the first network and second network will be at least slightly misaligned (will not collide).

As another illustrative example, it may be advantageous to align (or synchronize) paging timing (e.g., PF) for each UE of a plurality or a set of UEs that may have some common application or a common feature or characteristic (e.g., a set of UEs that are receiving a specific type of data, or a set of UEs that are the same UE type, or having a same UE/handset manufacturer or model). In that case, the CN may send a different UE identity to each (or some) of these UEs, which may be designed to provide the same paging timing (e.g., same PF). For example, based on Eqn. 1, a plurality of different UE identities may be selected (and assigned to UEs within the set of UEs) that result in a mapping or association with a same PF or paging timing, e.g., due to the mod (modulus) 1024 operation in Eqn. 1 (allowing a plurality of UE identities to map to the same PF or paging timing, due to the modulus operation in Eqn. 1).

In some cases, while using the second (or other or additional) UE identity for paging purposes, the UE may continue to use the first (or primary) UE identity for one or more other (e.g., non-paging) purposes, such as, for example, requesting or obtaining security keys, authentication, performing random access or establishing a connection, and/or other UE functions.

These are only a few examples of when a paging timing for a UE may be changed or adjusted via an assignment of a second or another UE identity. Other examples and further details are described herein.

According to an example embodiment, a method may include receiving, by a user equipment (UE), at least a first UE identity assigned to the user equipment for a wireless network, the first UE identity associated with a first paging timing; and receiving, by the user equipment, a second UE identity that has been assigned to the user equipment at least for paging purposes that adjusts a paging timing from a first paging timing associated with the first UE identity to a second paging timing associated with the second UE identity, wherein the second paging timing is different from the first paging timing.

The method may further include sending, by the user equipment, a request to adjust a paging timing for the user equipment, to be different than the first paging timing, via assignment of a second UE identity to the user equipment. The method may further include determining, by the user equipment, the second paging timing based on the second UE identity.

According to an example embodiment, the request may include (or may indicate) timing information upon which the second UE identity is based, the timing information including at least one of the following: a time of a paging instance that is requested for the user equipment; a time of a paging instance that is requested for the user equipment, wherein the time of the paging instance that is requested is indicated as an offset with respect to, or relative to, a system frame number; a requested UE identity; and a requested UE identity that is indicated by an offset relative to the first UE identity.

The method may further include monitoring a wireless channel (e.g., which may include receiving or decoding a signal on the wireless channel, and/or detecting if a specific signal has been received on the wireless channel) based on the second UE identity or based on the second paging timing. For example, the method may further include at least one of: monitoring a wireless channel for a paging message based on the second UE identity, instead of based on the first UE identity; monitoring a wireless channel for a paging message at a time based on the second paging timing associated with the second UE identity, instead of based on the first paging timing associated with the first UE identity; monitoring, by the user equipment, a wireless channel for a downlink signal based on the second UE identity, instead of based on the first UE identity; or, monitoring, by the user equipment, a wireless channel for a downlink signal at a time based on the second paging timing, instead of based on the first paging timing.

For example, the monitoring may include at least one of: monitoring, by the user equipment at a time indicated by the second paging timing associated with the second UE identity, a downlink control information to receive a paging message indicated by a group paging radio network temporary identifier associated with a cell; monitoring, by the user equipment based on the receiving the paging message indicated by the group paging radio network temporary identifier associated with a cell, information indicated by or encrypted by the second UE identity; or monitoring, based on the second UE identity, a power saving control signal or wakeup signal sent to the user equipment to cause the user equipment to wake from a power saving state.

The method may further include receiving, by the user equipment, a downlink signal (which may be a paging message, or other downlink signal, such as) based on the second UE identity, instead of based on the first UE identity; or receiving, by the user equipment, a paging message based on the second UE identity, instead of based on the first UE identity.

According to an example embodiment, the first paging timing and the second paging timing each may include, a time of a paging instance, based on the associated UE identity, when a paging message may be transmitted by a network or received by the user equipment.

According to an example embodiment, the first paging timing and the second paging timing each may include, based on the associated UE identity, at least one of: a time of a paging instance when a paging message may be transmitted to the user equipment or received by the user equipment; a paging frame indicating a time or location when a paging message may be transmitted to the user equipment or received by the user equipment; or, a combination of 1) a paging frame, and 2) a subframe or paging occasion within the paging frame, indicating a time or location when a paging message may be transmitted to the user equipment or received by the user equipment.

According to an example embodiment, the first UE identity may be associated with a first wireless network operator or associated with a first wireless network that is identified by or associated with a first public land mobile network; and, the second UE identity may be associated with a second wireless network operator, different from the first wireless network operator, or associated with a second wireless network that is identified by or associated with a second public land mobile network, and which is different than the first wireless network.

According to another example embodiment, a method (e.g., which may be performed by a RAN node (e.g., BS, eNB, gNB), core network, and/or other network entity) may include: determining that a first paging timing associated with a first UE identity that is assigned to a first user equipment is misaligned with, or occurring at a different time than, a second paging timing associated with a second UE identity that is assigned to a second user equipment; and sending a message to the first user equipment to assign, at least for paging or control purposes, a third UE identity to the first user equipment, wherein the third UE identity is associated with a third paging timing; wherein the third paging timing is aligned with, or occurring at a same time as, the second paging timing.

The method may further include sending a single paging message or control message to both the first user equipment and the second user equipment at a time instance based on the alignment of the third paging timing with the second paging timing.

The method may further include sending, by a radio access network (RAN) node, a request to assign, at least for paging or control purposes, a third UE identity to the first user equipment, wherein the third UE identity is associated with a third paging timing, so as to cause to align in the time domain, or occur at the same time, the third paging timing of the first user equipment with the second paging timing of the second user equipment.

According to an example embodiment, various techniques are described that allow for a UE to obtain or be assigned a second (or additional) UE identity to adjust or change its paging timing. The second UE identity may be used for one or more UE operations, such as receiving a paging message, and/or possibly receiving other downlink control information. In some example embodiments, a negotiation mechanism may be provided in which the UE may request an additional UE identity (e.g., a second UE identity), and may provide one or more timing information or timing parameters (e.g., a requested UE identity, or a requested paging timing, a requested UE identity that may be indicated by an offset to the current UE identity, an offset to the current paging timing, . . . ) to indicate or guide the network's assignment of the additional UE identity to the UE.

In another example embodiment, the network (e.g., core network, RAN node or other network entity), for example, without being requested by a UE, may send an updated or additional UE identity to each of one or more UEs within the network, e.g., to adjust a paging timing for one or more of these UE(s). Thus, by a network remapping or reassigning a UE to a different (e.g., additional or second) UE identity, the paging timing for the UE may be adjusted or changed. Also, in some cases, through this assignment of a second or additional UE identity, the UE identity and or timing used by the UE to receive or monitor other types of downlink control signals (e.g., in addition to a paging message) may be changed as well.

There may exist a variety of example situations or example use cases in which assignment of an additional UE identity, or the adjusting or changing of a paging timing for a UE via assignment of an additional (or second) UE identity may be useful or advantageous.

Use Cases (Examples) 1A and 1B: Multiple UE_ID Operation in a Single UE

According to an illustrative example embodiment, a UE may be assigned multiple UE identifiers (e.g., multiple IMSIs, or multiple TMSIs). These multiple UE identities may be associated with (or assigned by) a same network or network operator, or may be associated with (or assigned by) different networks or network operators. For example, a UE may have more than one SIM card active at a time (e.g., with a different UE identity associated with each SIM card, and a different paging timing for each of the UE identities). As an illustrative example, a UE may support dual-SIM in IDLE mode (e.g., each SIM card may belong to or may be associated with a different mobile operator/network operator). Due to the two SIM cards and two associated UE identities assigned to the UE, this means that the UE should monitor paging channels (and likely different frequency resources of these two different paging channels) of the two networks associated with the distinct SIM cards. This may allow the UE to monitor paging messages from the multiple (e.g., two) network (mobile) operators. According to an example embodiment, one or more electronic SIM cards (eSIM) (e.g., a SIM that may be electronically assigned to the UE, and which does not require a physical SIM card to be installed on the UE) may also be assigned to a UE. Other techniques may be provided or used to assign additional UE identities to a UE. For example, a UE may receive a virtual UE identity (e.g., virtual IMSI), or other assigned UE identity (which may or may not be associated with a SIM card or eSIM). These are a few examples illustrating how a UE may be assigned multiple UE identities.

However, the assignment of multiple UE identities to a UE may cause one or more problems or challenges to arise, including for example: 1A) a conflict in the monitoring of paging channels of the multiple (e.g., two) UE identities may arise if the paging timing (e.g., paging time instants) are the same for multiple UE identities assigned to the UE; and, 1B) a significant separation in time between the paging time instants (or paging timing) for the two UE identities of the UE may cause significant power consumption because the UE may need to remain on or active for a very long period of time (thus, delaying a transition to sleep or low power state), or the UE may need to separately power back on to monitor paging messages for both UE identities (causing additional power consumption as this power on of circuits of the UE is performed for each of the two UE identities). The two example use cases are briefly described below with reference to FIGS. 2-3. Use case 1A is described with respect to FIG. 2, and use case 1B is described with respect to FIG. 3, as some illustrative example embodiments.

Figure 2:
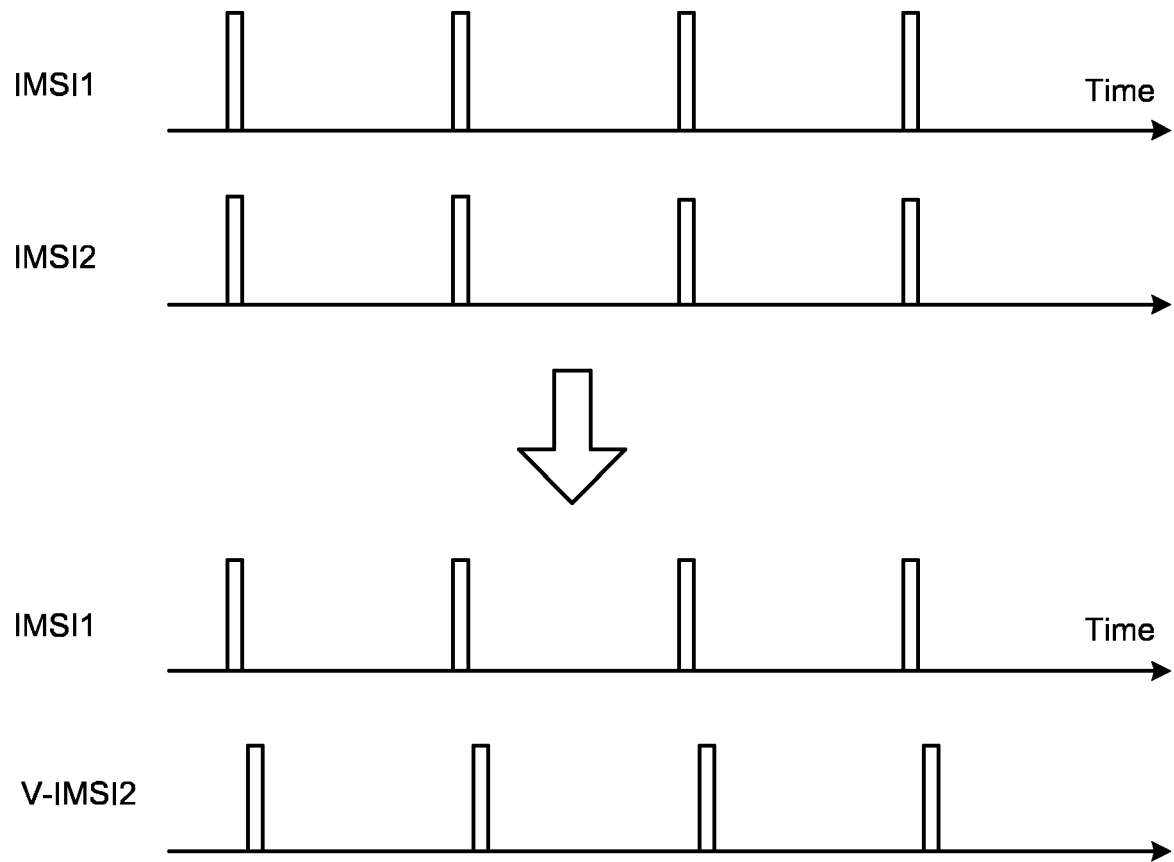
FIG. 2 is a diagram illustrating two UE identities of a UE are experiencing collisions (or alignment) between paging time instants according to an example embodiment.

With respect to use case 1A, FIG. 2 is a diagram illustrating two UE identities of a UE are experiencing collisions (or alignment) between paging time instants according to an example embodiment. A UE may be assigned a first UE identity (IMSI1) and a second UE identity (IMSI2), e.g., by different network (or mobile) operators. In this example, as shown in FIG. 2, the paging time instant(s) (or paging timing) for IMSI1 collides in the time domain (occurs at the same time) with the paging time instant(s) (or paging timing) for IMSI2. Thus, in this example, the paging frame (PF) and paging occasion (PO) or subframe for the paging message may be aligned (provided at the same time) for IMSI1 and IMSI2. Typically, a UE can monitor or receive signals from only one network at a time (e.g., because the UE typically only has 1 wireless receiver). Thus, the UE in this example is unable to monitor a channel for paging messages for both IMSI1 and IMSI2 (which likely use different frequency resources) at the same time. It would be better if the paging timing or paging time instant(s) for the first UE identity (IMSI1) and the second UE identity were sufficiently offset or misaligned (separated, or orthogonal) in time to allow the UE to monitor or receive paging messages for both the first UE identity and the second UE identity.

Therefore, to provide an offset in time between these two identities, the UE may send a request to one of the network operators to adjust its paging timing via assignment of an additional or a second UE identity. For example, the UE may send the network (e.g., core network, RAN node, or BS or other network entity) associated with the IMSI2 assigned to the UE, a request to adjust a paging timing for the UE, to be different (so the paging timing for the UE is different) than the paging timing associated with IMSI2, via assignment of an additional or a second UE identity (virtual IMSI2, or V-IMSI2). The request may include or indicate one or more timing information or timing parameters that may be used by the network to assign the additional or second UE identity (V-IMSI2) to the UE. Some example timing information or timing parameters that may be included in the request may include, e.g., a time of a paging instance (a paging timing) that is requested for the UE; a time of a paging instance that is requested, where the time of the paging instance is indicated by an offset relative to the paging time instance of the first UE identity (e.g., x ms offset from paging time instance IMSI2), or indicated as an offset with respect to a system frame number (SFN); a requested UE identity; a requested UE identity that is indicated by an offset relative to the first UE identity (e.g., an offset from IMSI2).

The network (e.g., core network, or other network entity) may receive, from the UE, the request to adjust the UE's paging timing via an assignment of a second or additional UE identity, and may determine the second or additional UE identity (V-IMSI2 in FIG. 2), e.g., based on the indicated timing information or timing parameters that may have been provided in or with the request, e.g., based on Eqn. 1, or using other technique. The network may then send a message to the UE indicating the additional or second UE identity (V-IMSI2) assigned to the UE, which may be used by the UE at least for paging purposes. The UE may, for example, power on (transition from a sleep or low power state to an on state or active state), monitor paging signals (e.g., receiving signals on a downlink control channel, and determine if a specific signal has been received or is present on the channel, such as a P-RNTI or other paging message) on a channel for the first UE identity (IMSI1), and then monitor paging signals on a channel for the new or additional UE identity (V-IMSI2), which has a paging time instant that is at least slightly offset or misaligned (orthogonal) in time from the paging time instant of the first UE identity (IMSI1), and then transition back to the sleep or low power state. In this manner, obtaining an additional UE identity may allow the UE to monitor channels for paging messages for both (or multiple) UE identities.

The UE may use the additional or second UE identity (V-IMSI2) for all UE functions. Or, the UE may use the additional or second UE identity (V-IMSI2) for a limited set of functions (including at least for paging purposes), and may continue to use the first (or primary) UE identity (IMSI2) for other (non-paging) purposes, e.g., such as, for example, requesting or obtaining security keys, performing authentication, performing random access or establishing a connection, and/or other UE functions.

Figure 3:
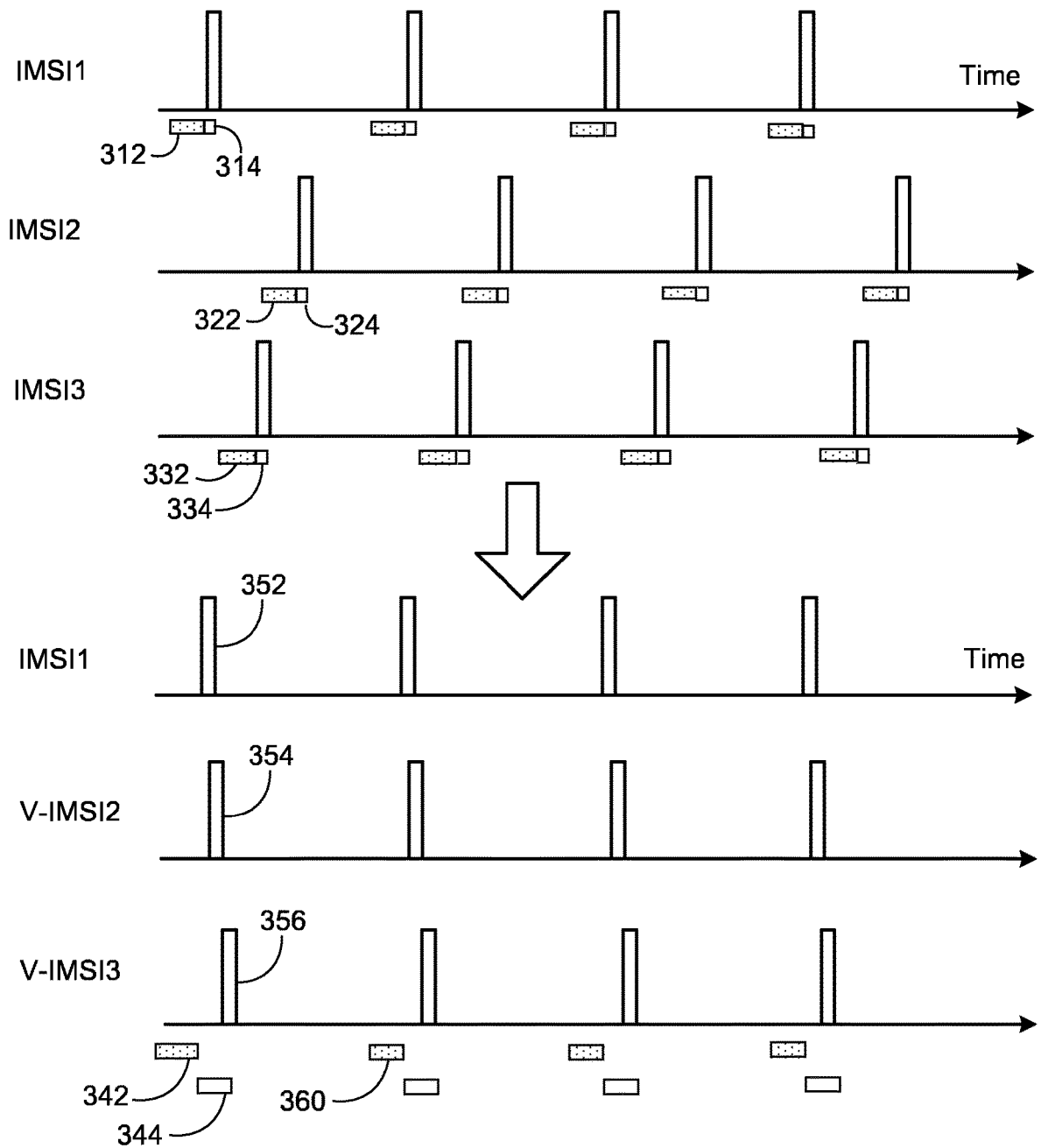
FIG. 3 is a diagram illustrating three UE identities that have paging time instants that are distributed in time.

With respect to use case 1B, FIG. 3 is a diagram illustrating three UE identities that have paging time instants that are distributed in time. As shown in FIG. 3, according to an example embodiment, IMSI1, IMSI2 and IMSI3 (as examples of UE identities) may be assigned to a UE by network (or network operator) 1, network 2 and network 3 (for example), respectively. As shown, the paging time instants for these three US identities are significantly (e.g., greater than a threshold) distributed (or separated) in time. Due to this significant distribution or separation in time of the paging time instants for these three UE identities, each of these UE identities (IMSI1, IMSI2, and IMSI3) each has (or is required to have) its own warm-up period prior to the respective paging time instant. According to an example embodiment, a warm-up period may be the period of time where circuits within the UE are turned on to allow the UE to transition from a sleep or inactive state to an on or active state, which requires time and power to turn on the UE circuits. For example, due to this separation in paging time instants, IMSI1 may have a warm-up period 312 prior to paging time instant 314; IMSI2 may have a warm-up period 322 prior to paging time instant 324; and, IMSI3 may have a warm-up period 332 prior to paging time instant 334. Thus, this may be considered power inefficient for the UE to have three separate warm-up periods in order to monitor paging messages for these three UE identities (IMSI1, IMSI2, and IMSI3). Thus, while the paging time instants for these three UE identities assigned to the UE do not collide (they are misaligned or separated in time), the separation or misalignment of these three paging time instants is greater than a threshold, and thus, may be considered power inefficient.

Thus, according to an example embodiment, the UE may request additional UE identities from network 2 and/or network 3, which are assigned as IMSI2 and IMSI3 to the UE, in order to change the paging timing of the UE with respect to network 2 and network 3. For example, the UE may provide one or more timing parameters as part of its request for a new or additional UE identity, in order to obtain additional UE identities, V-IMSI2, V-IMSI3, from network 2 and network 3, respectively, in order to more closely align the paging timings of the UE for IMSI1, V-IMSI2, and V-IMSI-3, e.g., to allow for a more power-efficient UE operation. For example, as shown in FIG. 3, the paging timing of IMSI1 and V-IMSI2 and V-IMSI3 now may include a common warm-up period 342 (for all three UE identities), and a paging monitoring period 344. The paging monitoring period may include a period of time where the UE may successively monitor (at 352, 354, and 356) a channel for paging messages for each of the three UE identities, e.g., including the UE: at 352, tuning or adjusting its receiver to a channel of network 1, monitoring for paging messages (e.g., receiving signals and detecting a presence or not of paging message) from network 1; at 354, tuning or adjusting its receiver to receive signals on a channel for network 2 and monitoring for paging messages from network 2; and at 356, tuning or adjusting its receiver to receive signals on a channel for network 3 and monitoring for paging messages from network 3. Thus, obtaining additional UE identities (e.g., V-IMSI2, and V-IMSI3) that having paging time instants that are more closely aligned to the paging instant(s) associated with IMSI1 may result in a more power efficient operation of the UE, e.g., since the UE may use a common warm-up period and then serially perform monitoring for paging messages on channels of each of the UE identities (IMSI1, V-IMSI2, and V-IMSI3), and then transitioning again (e.g., via a common power-down period) to a sleep or inactive state. Thus, according to an example embodiment, the paging time instants for IMSI1, V-IMSI2 and V-IMSI3 may be only slightly misaligned to occur within a threshold period of time (e.g., misaligned or occurring at separate times, such as 352, 354, and 356, but occurring within a threshold time period), so as to allow a more power efficient operation for the UE. Thus, this approach may allow the UE to transition once from inactive or sleep state to an on or active state (including a circuit warm-up period 342), and then monitor channels for paging messages for each of these multiple UE identities successively, and then transitioning back to inactive or sleep state, until the next common warm-up period 360 prior to the three paging time instants.

Use Case (or Example) 2: Time Alignment of Paging for Multiple UEs

Figure 4:
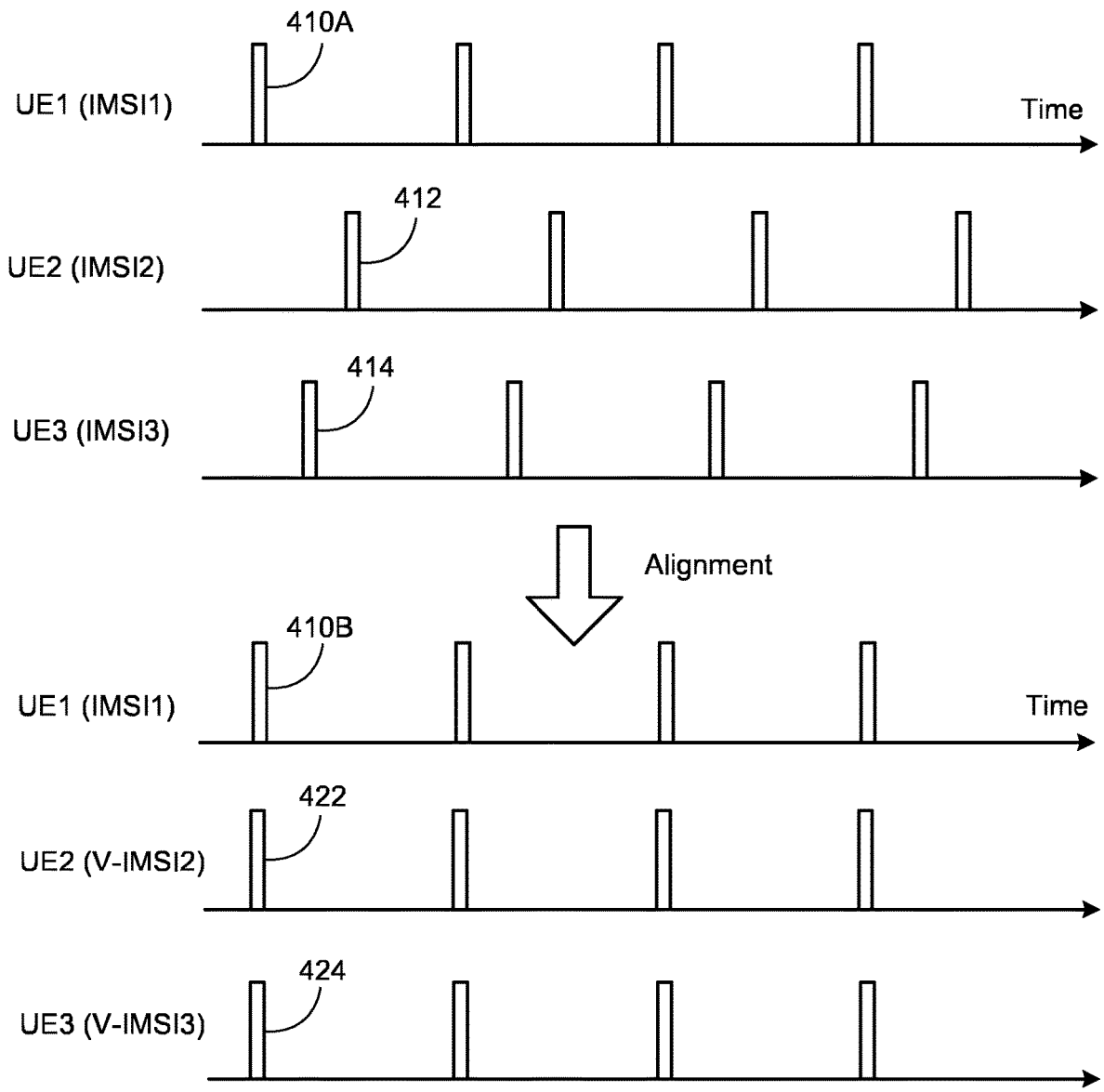
FIG. 4 is a diagram illustrating a distribution of paging time instants for a plurality of user equipment according to an example embodiment.

With respect to use case 2, FIG. 4 is a diagram illustrating a distribution of paging time instants for a plurality of user equipment according to an example embodiment. In some cases, some networks may operate to ensure a statistically even distribution of UEs over available system resources, such as over available paging message resources, or other resources.

However, in some situations, it might be beneficial to introduce some control (e.g., by the network core network, or RAN node, or other network entity) that allows for some control of the randomness of paging resource allocation. This control may be relevant for a number of scenarios or situations, e.g., where it might be attractive for the radio access network to have alignment of a certain set of UEs such that they are monitoring for specific system broadcast signalling or have a shared common instant where they are trying to access the system. One implementation related to the first aspect would be in case the network is using specifically designed broadcast information (where the specifically tailored system information is only available at given time instants to reduce the system/network overhead). For the latter aspect, it could be covering situations where a base station is listening for specific signals on a dedicated resource (for instance random access attempts on a specific beam). No matter which specific cause for the need for time alignment of "access instants", the idea here, in this illustrative example of use case 2, is that the network is able to coordinate the timing (or reassignment of resources to one or more UEs) through the assignment of a different UE identity towards the UE.

As another illustrative example, it may be advantageous to align (or synchronize) paging timing (e.g., PF) for each UE of a plurality or a set of UEs that may have some common application or a common feature or characteristic (e.g., a set of UEs that are receiving a specific type of data, or a set of UEs that are the same UE type, or having a same UE/handset manufacturer or model). In that case, the CN may send a different UE identity to each (or some) of these UEs, which may be designed to provide the same paging timing (e.g., same PF), or some other timing for a common resource (e.g., to receive some broadcast control information from the network). For example, based on Eqn. 1, a plurality of different UE identities may be selected (and assigned to UEs within the set of UEs) that result in a mapping or association with a same PF or paging timing, e.g., due to the mod (modulus) 1024 operation in Eqn. 1 (allowing a plurality of UE identities to map to the same PF or paging timing, due to the modulus operation in Eqn. 1).

Thus, as shown in FIG. 4, initially, an IMSI1 is assigned to UE1, IMSI2 is assigned to UE2, and IMSI3 is assigned to UE3, and the access instants (for monitoring or receiving some control information from the network, such as paging messages, or even other control information) are misaligned or separated in time. Thus, for example, the access instants 410A (for IMSI1), 412 (for IMSI2) and 414 (for IMSI3) all occur at different times (and thus, are misaligned). The network (e.g., core network, RAN node, and/or other network entity) may detect the misalignment of the access instants (410A, 412, 414) for these three UEs. In order to align the access instants (e.g., paging time instants, or other time instants to monitor or receive control information from the network) for UE1, UE2 and UE3, the network may assign a new UE identity to UE2 (V-IMSI2) and a new UE identity to UE3 (V-IMSI3). The network may select (e.g., see Eqn. 1, as an illustrative example, upon which the UE identity selection may be performed by the network) V-IMSI2 and V-IMSI3 so that the access instants (e.g., such as a paging time instants) for IMSI1 (at 410B), for V-IMSI2 (at 422), and for V-IMSI3 (at 424) are all aligned or occur at the same time. In this manner, by aligning the access instants for UE1, UE2 and UE3, this may allow one or more UE operations, with respect to the network, to be performed at the same time, such as transmission of broadcast control information, transmission of a paging message, etc.

It should be noted that this new identity is a UE identity remapping when seen from the network side—hence it is different from a group RNTI (G-RNTI), which may be used by a single eNB or gNB to address multiple UEs using the same scheduling grant (single transmission point to multiple reception points). As such, the V-IMSI is different from G-RNTI on a number of parameters: The UE may be able to negotiate the value towards the core network; the UE will keep the understanding of the newly obtained identity even when it enters IDLE or Inactive mode; no more than one UE will be able to be assigned one V-IMSI at a time (UE uniqueness). Thus, even for other use cases or applications described herein, the assignment of a new or additional UE identity may be, for example, a UE-specific UE identity (one UE identity, such as V-IMSI, assigned to only one UE), and is not associated with a group of UEs.

As another use case, the RAN node, BS or cell discovers that (e.g., by coincidence), a set of UEs (e.g., all 10 UEs) have a same access instant or paging instant (e.g., same paging timing), e.g., based on the mod 1024 operation from Eqn. 1. The core network or other network entity may reallocate some of these 10 UEs to another paging timing via assignment of a new UE identity, due to limited paging resources, or to improve paging capacity, or to improve usage of paging resources, for example.

Some further example embodiments are now described.

Figure 5:
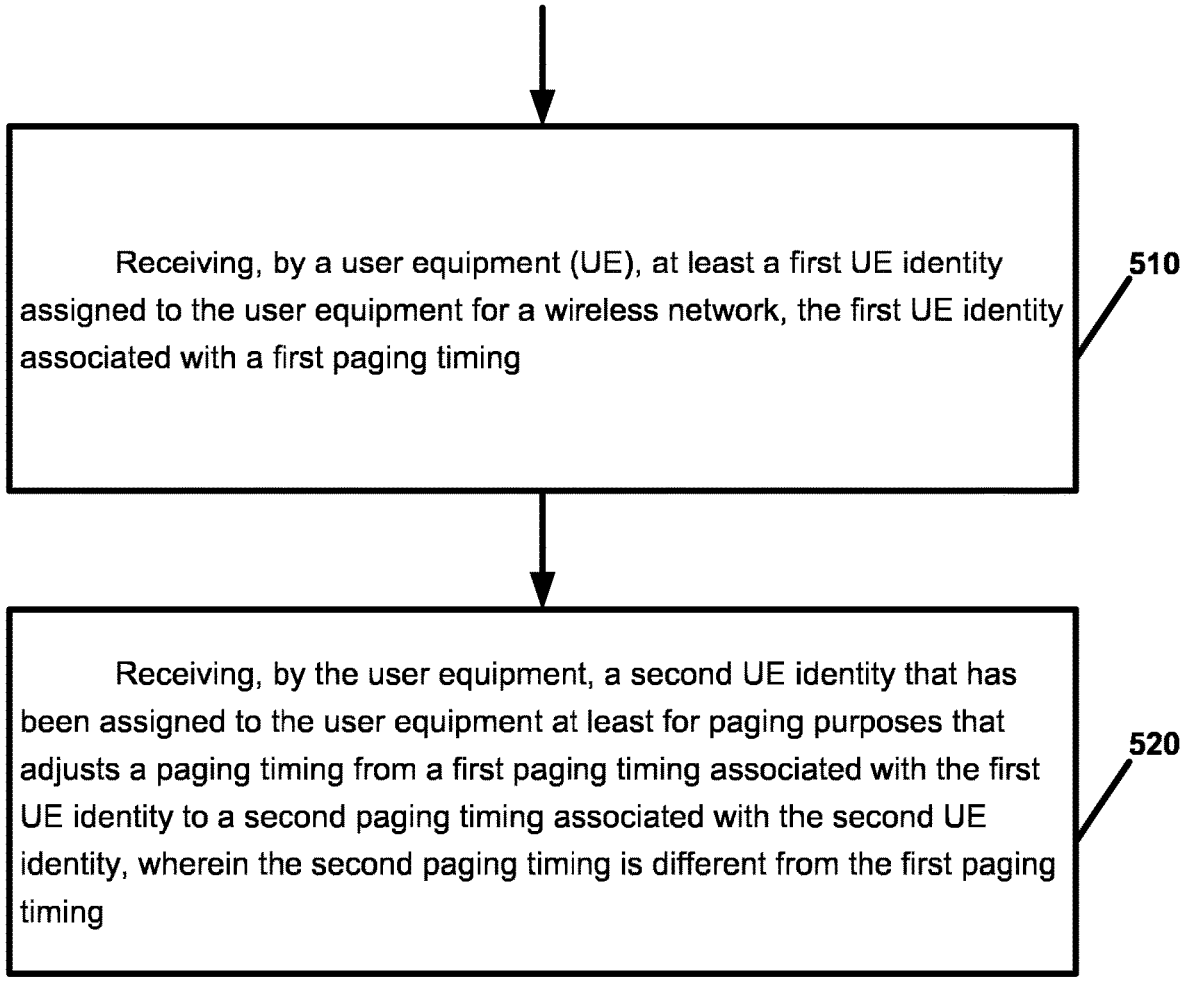
FIG. 5 is a flow chart illustrating operation of a user equipment according to an example embodiment.

Example 1. FIG. 5 is a flow chart illustrating operation of a user equipment according to an example embodiment. Operation 510 includes receiving, by a user equipment (UE), at least a first UE identity assigned to the user equipment for a wireless network, the first UE identity associated with a first paging timing. And, operation 520 includes receiving, by the user equipment, a second UE identity that has been assigned to the user equipment at least for paging purposes that adjusts a paging timing from a first paging timing associated with the first UE identity to a second paging timing associated with the second UE identity, wherein the second paging timing is different from the first paging timing.

Example 2. The method of Example 1, further comprising: sending, by the user equipment, a request to adjust a paging timing for the user equipment, to be different than the first paging timing, via assignment of a second UE identity to the user equipment.

Example 3. The method of any of Examples 1-2, further comprising: determining, by the user equipment, the second paging timing based on the second UE identity.

Example 4. The method of any of Examples 2-3, wherein the request comprises timing information upon which the second UE identity is based, the timing information including at least one of the following: a time of a paging instance that is requested for the user equipment; a time of a paging instance that is requested for the user equipment, wherein the time of the paging instance that is requested is indicated as an offset with respect to, or relative to, a system frame number; a time of a paging instance that is requested for the user equipment, wherein the time of the paging instance that is requested is indicated as an offset with respect to the time of a paging instance of the first UE identity; a requested UE identity; and a requested UE identity that is indicated by an offset relative to the first UE identity.

Example 5. The method of any of Examples 2-4, wherein the sending the request is performed based on: determining that the first paging timing associated with the first UE identity is misaligned, by more than a threshold, with a third paging timing associated with a third UE identity that is assigned to the user equipment.

Example 6. The method of any of Examples 2-4, wherein the sending the request is performed based on: determining that the first paging timing associated with the first UE identity is aligned with a third paging timing associated with a third UE identity that is assigned to the user equipment.

Example 7. The method of any of Examples 1-6 and further comprising: monitoring a wireless channel for a paging message based on the second UE identity, instead of based on the first UE identity.

Example 8. The method of any of Examples 1-7 and further comprising: monitoring a wireless channel for a paging message at a time based on the second paging timing associated with the second UE identity, instead of based on the first paging timing associated with the first UE identity.

Example 9. The method of any of Examples 1-8 and further comprising: monitoring, by the user equipment, a wireless channel for a downlink signal based on the second UE identity, instead of based on the first UE identity.

Example 10. The method of any of Examples 1-9 and further comprising: monitoring, by the user equipment, a wireless channel for a downlink signal at a time based on the second paging timing, instead of based on the first paging timing.

Example 11. The method of any of Examples 1-10 and further comprising: receiving, by the user equipment, a downlink signal based on the second UE identity, instead of based on the first UE identity.

Example 12. The method of any of Examples 1-11 and further comprising: receiving, by the user equipment, a paging message based on the second UE identity, instead of based on the first UE identity.

Example 13. The method of any of Examples 7-12 wherein the monitoring comprises at least one of: monitoring, by the user equipment at a time indicated by the second paging timing associated with the second UE identity, a downlink control information to receive a paging message indicated by a group paging radio network temporary identifier associated with a cell; monitoring, by the user equipment based on the receiving the paging message indicated by the group paging radio network temporary identifier associated with a cell, information indicated by or encrypted by the second UE identity; or monitoring, based on the second UE identity, a power saving control signal or wakeup signal sent to the user equipment to cause the user equipment to wake from a power saving state.

Example 14. The method of any of Examples 1-13, wherein the first paging timing and the second paging timing each comprises, a time of a paging instance, based on the associated UE identity, when a paging message may be transmitted by a network or received by the user equipment.

Example 15. The method of any of Examples 1-14, wherein the first paging timing and the second paging timing each comprises, based on the associated UE identity, at least one of: a time of a paging instance when a paging message may be transmitted to the user equipment or received by the user equipment; a paging frame indicating a time or location when a paging message may be transmitted to the user equipment or received by the user equipment; and a combination of 1) a paging frame, and 2) a subframe or paging occasion within the paging frame, indicating a time or location when a paging message may be transmitted to the user equipment or received by the user equipment.

Example 16. The method of any of Examples 5-6, wherein: the first UE identity is associated with a first wireless network operator or associated with a first wireless network that is identified by or associated with a first public land mobile network; the third UE identity is associated with a second wireless network operator or associated with a second wireless network that is identified by or associated with a second public land mobile network.

Example 17. The method of any of Examples 1-16, and further comprising: receiving, by the user equipment from a network, a request to adjust a paging timing for the user equipment, to be different than the first paging timing, via an assignment of another UE identity to the user equipment.

Example 18. The method of any of Examples 1-17, wherein the receiving, by a user equipment (UE), at least a first UE identity comprises: receiving, by the user equipment (UE), the first UE identity assigned to the user equipment, the first UE identity associated with a first paging timing; receiving, by the user equipment, a third UE identity assigned to the user equipment, the third UE identity associated with a third paging timing; and determining, by the user equipment based on a time-domain relationship of the first paging timing to the third paging timing, a need to adjust at least one of the first paging timing and the third paging timing; and sending, by the user equipment in response to the determining, a request to adjust the first paging timing for the user equipment, via assignment of a second UE identity to the user equipment.

Example 19. The method of any of any of Examples 1-17, wherein the receiving, by a user equipment (UE), at least a first UE identity comprises: receiving, by the user equipment (UE), the first UE identity assigned to the user equipment, the first UE identity associated with a first paging timing; receiving, by the user equipment, a third UE identity assigned to the user equipment, the third UE identity associated with a third paging timing; the method further comprising determining, by the user device, that the first paging timing is aligned with the second paging timing; and wherein the sending the request comprises sending, by the user equipment, a request including timing information, to adjust a paging timing for the user equipment, via assignment of a second UE identity, such that the second paging timing will be misaligned in the time domain with, or occurring at a different time than, the third paging timing.

Example 20. The method of any of Examples 2-19, wherein the sending a request comprises at least one of the following: sending, by the user equipment, a request including timing information, to adjust a paging timing for the user equipment, via assignment of a second UE identity, such that the second paging timing will be misaligned in the time domain with, or occurring at a different time than, a third paging timing, wherein the third paging timing is associated with a third UE identity that has been assigned to the user equipment; or sending, by the user equipment, a request including timing information, to adjust a paging timing for the user equipment, via assignment of a second UE identity, such that the second paging timing will be at least more aligned in the time domain with, or occurring closer in time with, a third paging timing than the first paging timing is aligned in the time domain with the third paging timing, wherein the third paging timing is associated with a third UE identity that has been assigned to the user equipment.

Example 21. An apparatus comprising means for performing the method of any of Examples 1-20.

Example 22. A non-transitory computer-readable storage medium comprising instructions stored thereon that, when executed by at least one processor, are configured to cause a computing system to perform the method of any of Examples 1-20.

Example 23. An apparatus comprising: at least one processor; and at least one memory including computer program code; the at least one memory and the computer program code configured to, with the at least one processor, cause the apparatus at least to perform the method of any of Examples 1-20.

Example 24. An apparatus comprising: at least one processor; and at least one memory including computer program code; the at least one memory and the computer program code configured to, with the at least one processor, cause the apparatus at least to: receive, by a user equipment (UE), at least a first UE identity assigned to the user equipment for a wireless network, the first UE identity associated with a first paging timing; and receive, by the user equipment, a second UE identity that has been assigned to the user equipment at least for paging purposes that adjusts a paging timing from a first paging timing associated with the first UE identity to a second paging timing associated with the second UE identity, wherein the second paging timing is different from the first paging timing.

Figure 6:
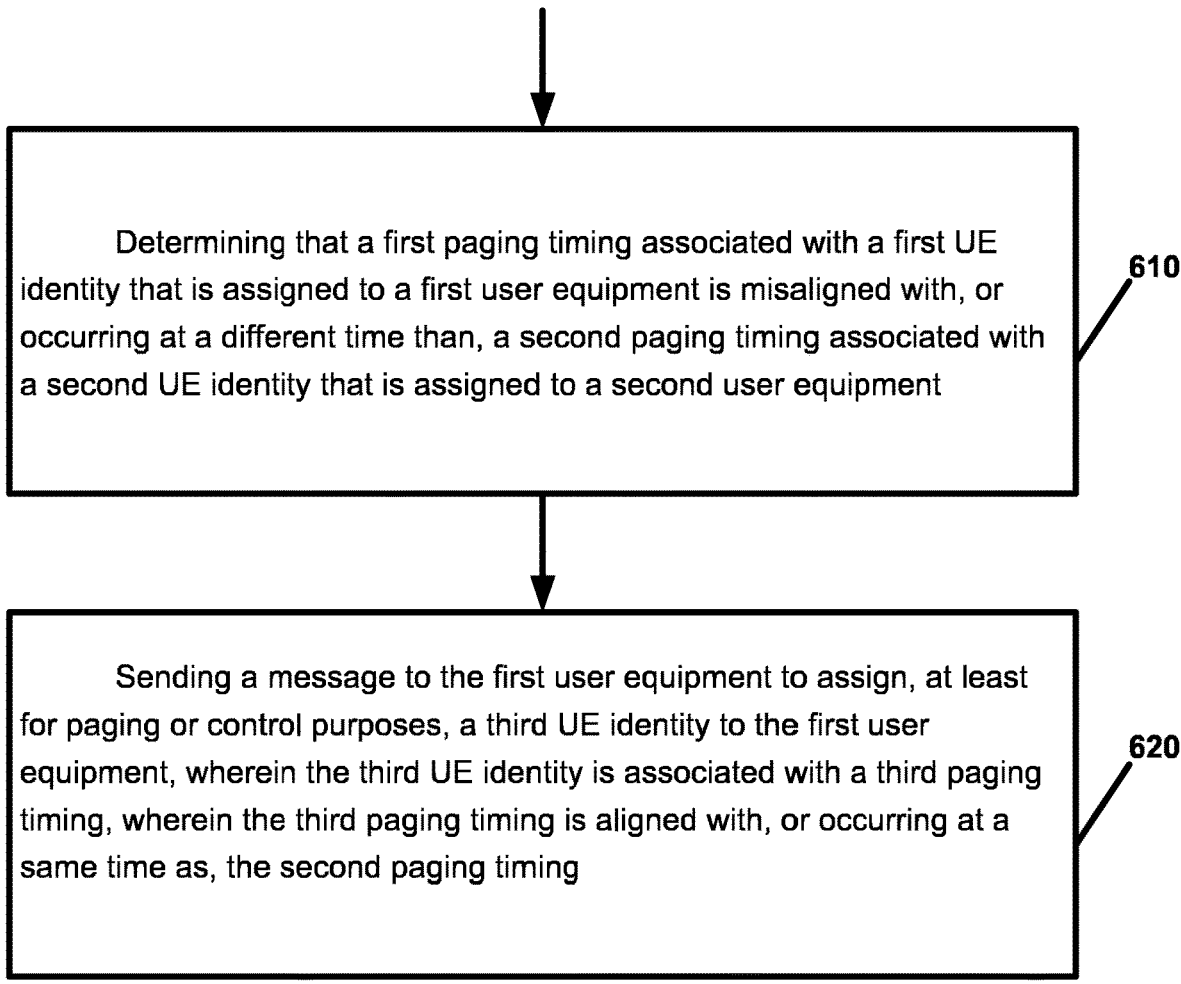
FIG. 6 is a flow chart illustrating operation of a network entity according to an example embodiment.

Example 25. FIG. 6 is a flow chart illustrating operation of a network entity according to an example embodiment. Operation 610 includes determining that a first paging timing associated with a first UE identity that is assigned to a first user equipment is misaligned with, or occurring at a different time than, a second paging timing associated with a second UE identity that is assigned to a second user equipment. And, operation 620 includes sending a message to the first user equipment to assign, at least for paging or control purposes, a third UE identity to the first user equipment, wherein the third UE identity is associated with a third paging timing, wherein the third paging timing is aligned with, or occurring at a same time as, the second paging timing.

Example 26. The method of Example 25 and further comprising: sending a single paging message or control message to both the first user equipment and the second user equipment at a time instance based on the alignment of the third paging timing with the second paging timing.

Example 27. The method of any of Examples 25-26, further comprising: sending, by a radio access network (RAN) node), a request to assign, at least for paging or control purposes, a third UE identity to the first user equipment, wherein the third UE identity is associated with a third paging timing, so as to cause to align in the time domain, or occur at the same time, the third paging timing of the first user equipment with the second paging timing of the second user equipment.

Example 28. An apparatus comprising means for performing the method of any of Examples 25-27.

Example 29. A non-transitory computer-readable storage medium comprising instructions stored thereon that, when executed by at least one processor, are configured to cause a computing system to perform the method of any of Examples 25-27.

Example 30. An apparatus comprising: at least one processor; and at least one memory including computer program code; the at least one memory and the computer program code configured to, with the at least one processor, cause the apparatus at least to perform the method of any of Examples 25-27.

Example 31. An apparatus comprising: at least one processor; and at least one memory including computer program code; the at least one memory and the computer program code configured to, with the at least one processor, cause the apparatus at least to: determine that a first paging timing associated with a first UE identity that is assigned to a first user equipment is misaligned with, or occurring at a different time than, a second paging timing associated with a second UE identity that is assigned to a second user equipment; and send a message to the first user equipment to assign, at least for paging or control purposes, a third UE identity to the first user equipment, wherein the third UE identity is associated with a third paging timing; wherein the third paging timing is aligned with, or occurring at a same time as, the second paging timing.

Example 32. The method of any of Examples 5-6, wherein: the first UE identity is associated with a first wireless network operator or associated with a first wireless network that is identified by or associated with a first public land mobile network; and the third UE identity is associated with the first wireless network operator or associated with the first wireless network that is identified by or associated with the first public land mobile network.

Example 33. A method comprises: receiving, by a user equipment (UE), at least a first UE identity assigned to the user equipment for a wireless network, the first UE identity associated with a first paging timing; and sending, by the user equipment, a request to adjust a paging timing for the user equipment, to be different than the first paging timing, via assignment of a second UE identity to the user equipment, the request including a requested UE identity.

Example 34. The method of Example 33, further comprising: receiving, by the user equipment, a message indicating the second UE identity assigned to the UE, which may be used by the UE at least for paging purposes.

Example 35. A method comprising: receiving, by a user equipment (UE), at least a first UE identity assigned to the user equipment for a wireless network, the first UE identity associated with a first paging timing; and sending, by the user equipment, an indication of a second UE identity to be assigned to the user equipment, the second UE identity associated with a second paging timing that is different than the first paging timing.

Example 36. An apparatus comprising means for performing the method of any of Examples 33-35.

Example 37. A non-transitory computer-readable storage medium comprising instructions stored thereon that, when executed by at least one processor, are configured to cause a computing system to perform the method of any of Examples 33-35.

Example 38. An apparatus comprising: at least one processor; and at least one memory including computer program code; the at least one memory and the computer program code configured to, with the at least one processor, cause the apparatus at least to perform the method of any of Examples 33-35.

Figure 7:
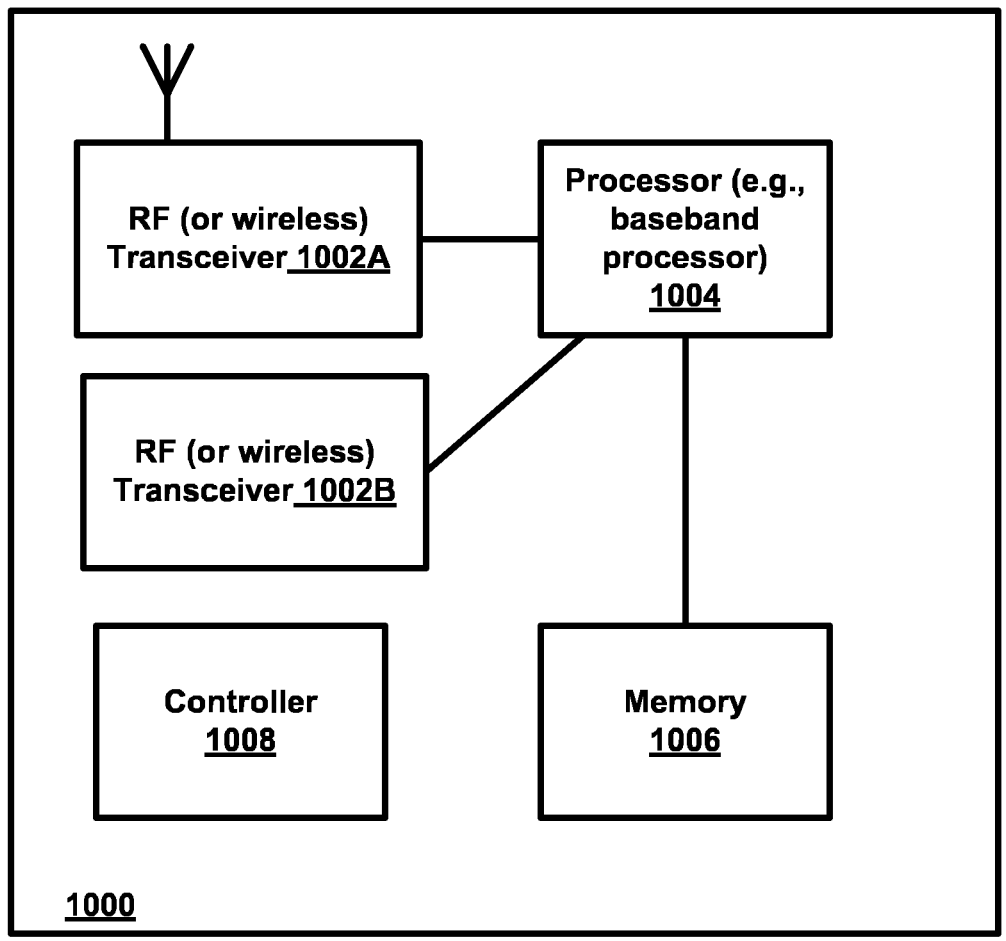
FIG. 7 is a block diagram of a wireless station (e.g., AP, BS, gNB, UE, or user device, or other network node) according to an example embodiment.

FIG. 7 is a block diagram of a wireless station (e.g., AP, BS or user device, or other network node) 1000 according to an example embodiment. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 7, a controller (or processor) 1008 may execute software and instructions, and may provide overall control for the station 1000, and may provide control for other systems not shown in FIG. 7, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them.

Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. An apparatus comprising: at least one processor; and at least one memory including computer program code; the at least one memory and the computer program code configured to, with the at least one processor, cause the apparatus at least to:
   receive, by a user equipment (UE), at least a first International Mobile Subscriber Identity (IMSI) assigned to the user equipment for a wireless network, the first IMSI associated with a first paging timing;
   send, by the user equipment, a request to adjust a paging timing for the user equipment, to be different than the first paging timing, via assignment of a new IMSI to the user equipment, the request including an offset relative to the first IMSI, wherein the offset indicates the new IMSI that is being requested to be assigned to the user equipment; and
   receive, by the user equipment in response to the request, a message indicating an assignment of the new IMSI to the user equipment to be used to determine paging timing.

2. The apparatus of claim 1, wherein the processor, the memory, and the computer program code are further configured to cause the apparatus to:
   determine, by the user equipment, a second paging timing based on the new IMSI.

3. The apparatus of claim 1, wherein the sending the request is performed based on determining that the first paging timing associated with the first IMSI is misaligned, by more than a threshold, with a third paging timing associated with a third IMSI that is assigned to the user equipment.

4. The apparatus of claim 3, wherein, the first IMSI is associated with a first wireless network operator or associated with a first wireless network that is identified by or associated with a first public land mobile network;
   the third IMSI is associated with a second wireless network operator or associated with a second wireless network that is identified by or associated with a second public land mobile network.

5. The apparatus of claim 1, wherein the sending the request is performed based on determining that the first paging timing associated with the first IMSI is aligned with a third paging timing associated with a third IMSI that is assigned to the user equipment.

6. The apparatus of claim 1, wherein the processor, the memory, and the computer program code are configured to cause the apparatus to monitor a wireless channel for a paging message based on the new IMSI, instead of based on the first IMSI.

7. The apparatus of claim 6, wherein the monitoring comprises at least one of:
   monitoring, by the user equipment at a time indicated by the second paging timing associated with the new IMSI, a downlink control information to receive a paging message indicated by a group paging radio network temporary identifier associated with a cell;
   monitoring, by the user equipment based on the receiving the paging message indicated by the group paging radio network temporary identifier associated with a cell, information indicated by or encrypted by the new IMSI; or
   monitoring, based on the new IMSI, a power saving control signal or wakeup signal sent to the user equipment to cause the user equipment to wake from a power saving state.

8. The apparatus of claim 1, wherein the processor, the memory, and the computer program code are configured to cause the apparatus to monitor a wireless channel for a paging message at a time based on the second paging timing associated with the new IMSI, instead of based on the first paging timing associated with the first IMSI.

9. The apparatus of claim 1, wherein the processor, the memory, and the computer program code are configured to cause the apparatus to monitor, by the user equipment, a wireless channel for a downlink signal based on the new IMSI, instead of based on the first IMSI.

10. The apparatus of claim 1, wherein the processor, the memory, and the computer program code are configured to cause the apparatus to monitor, by the user equipment, a wireless channel for a downlink signal at a time based on the second paging timing, instead of based on the first paging timing.

11. The apparatus of claim 1, wherein the processor, the memory, and the computer program code are configured to cause the apparatus to receive, by the user equipment, a downlink signal based on the new IMSI, instead of based on the first IMSI.

12. The apparatus of claim 1, wherein the processor, the memory, and the computer program code are configured to cause the apparatus to receive, by the user equipment, a paging message based on the new IMSI, instead of based on the first IMSI.

13. The apparatus of claim 1, wherein the first paging timing and the second paging timing each comprises, a time of a paging instance, based on the associated IMSI, when a paging message may be transmitted by a network or received by the user equipment.

14. The apparatus of claim 1, wherein the first paging timing and the second paging timing each comprises, based on the associated identity IMSI, at least one of:
   a time of a paging instance when a paging message may be transmitted to the user equipment or received by the user equipment;
   a paging frame indicating a time or location when a paging message may be transmitted to the user equipment or received by the user equipment; or
   a combination of a paging frame, and a subframe or paging occasion within the paging frame, indicating a time or location when a paging message may be transmitted to the user equipment or received by the user equipment.

15. The apparatus of claim 1, wherein the processor, the memory, and the computer program code are configured to cause the apparatus to receive, by the user equipment from a network, a request to adjust a paging timing for the user equipment, to be different than the first paging timing, via an assignment of a new IMSI to the user equipment.

16. The apparatus of claim 1, wherein the processor, the memory, and the computer program code are configured to cause the apparatus to:
   receive, by the user equipment, the first IMSI assigned to the user equipment, the first IMSI associated with a first paging timing;
   receive, by the user equipment, a third IMSI assigned to the user equipment, the third IMSI associated with a third paging timing; and
   determine, by the user equipment based on a time-domain relationship of the first paging timing to the third paging timing, a need to adjust at least one of the first paging timing or the third paging timing; and
   send, by the user equipment in response to the determining, a request to adjust the first paging timing for the user equipment, via assignment of a new IMSI to the user equipment.

17. The apparatus of claim 1, wherein the processor, the memory, and the computer program code are configured to cause the apparatus to:
   receive, by the user equipment, the first IMSI assigned to the user equipment, the first IMSI associated with a first paging timing;
   receive, by the user equipment, a third IMSI assigned to the user equipment, the third IMSI associated with a third paging timing;
   determine, by the user device, that the first paging timing is aligned with the second paging timing; and
   send, by the user equipment, a request including timing information, to adjust a paging timing for the user equipment, via assignment of a new IMSI, such that the second paging timing will be misaligned in the time domain with, or occurring at a different time than, the third paging timing.

18. A method comprising:
   receiving, by a user equipment, at least a first International Mobile Subscriber Identity (IMSI) assigned to the user equipment for a wireless network, the first IMSI associated with a first paging timing;
   sending, by the user equipment, a request to adjust a paging timing for the user equipment, to be different than the first paging timing, via assignment of a new IMSI to the user equipment, the request including an offset relative to the first IMSI, wherein the offset indicates the new IMSI that is being requested to be assigned to the user equipment; and
   receiving, by the user equipment in response to the request, a message indicating an assignment of the new IMSI to the user equipment to be used to determine paging timing.

19. A non-transitory computer-readable storage medium comprising instructions stored thereon that, when executed by at least one processor, are configured to cause a computing system to:
   receive, by a user equipment, at least a first International Mobile Subscriber Identity (IMSI) assigned to the user equipment for a wireless network, the first IMSI associated with a first paging timing; and
   send, by the user equipment, a request to adjust a paging timing for the user equipment, to be different than the first paging timing, via assignment of a new IMSI to the user equipment, the request including an offset relative to the first IMSI, wherein the offset indicates the new IMSI that is being requested to be assigned to the user equipment; and
   receive, by the user equipment in response to the request, a message indicating an assignment of the new IMSI to the user equipment to be used to determine paging timing.

* * * * *